United States Patent
Cha et al.

(10) Patent No.: US 9,450,911 B2
(45) Date of Patent: Sep. 20, 2016

(54) SYSTEM AND METHOD FOR MANAGING ETHERNET COMMUNICATION NETWORK FOR USE IN VEHICLE

(75) Inventors: Sang Ho Cha, Gyeonggi-do (KR); Dong Ok Kim, Gyeonggi-do (KR); Jin Hwa Yun, Seoul (KR); Yong Ho Noh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 314 days.

(21) Appl. No.: 13/567,371

(22) Filed: Aug. 6, 2012

(65) Prior Publication Data

US 2013/0159489 A1 Jun. 20, 2013

(30) Foreign Application Priority Data

Dec. 15, 2011 (KR) .................. 10-2011-0135799

(51) Int. Cl.
*G06F 15/173* (2006.01)
*H04L 29/12* (2006.01)
(Continued)

(52) U.S. Cl.
CPC ..... *H04L 61/2038* (2013.01); *H04L 12/40039* (2013.01); *H04L 41/0809* (2013.01); *H04L 61/2015* (2013.01); *H04L 65/105* (2013.01); *H04L 65/1069* (2013.01); *H04L 65/4076* (2013.01); *H04L 2012/40273* (2013.01); *Y02B 60/35* (2013.01)

(58) Field of Classification Search
CPC .................. H04L 2012/40273; H04L 61/2015
USPC ....................................................... 709/223
See application file for complete search history.

(56) References Cited

U.S. PATENT DOCUMENTS

| 5,726,984 A | 3/1998 | Kubler et al. |
| 2004/0051379 A1* | 3/2004 | Turner et al. ............... 307/10.2 |

(Continued)

FOREIGN PATENT DOCUMENTS

| JP | 10329628 A | 12/1998 |
| JP | 2008236217 A | 10/2008 |

OTHER PUBLICATIONS

Herpel, Thomas. Performance Evaluation of Time-Critical Data Transmission in Automotive Communication Systems. Aug. 24, 2009 (submission). pp. 39-40, Fig. 4.10-4.11.*

(Continued)

*Primary Examiner* — Wing F Chan
*Assistant Examiner* — Andrew Woo
(74) *Attorney, Agent, or Firm* — Mintz Levin Cohn Ferris Glovsky and Popeo, P.C.; Peter F. Corless

(57) ABSTRACT

A system and method for managing a vehicle Ethernet communication network are disclosed. More specifically, each unit in a vehicle Ethernet communication network is configured to initially enter a power-on (PowerOn) mode when is applied to each unit of the vehicle to initialize operational programs. Once powered on, each unit enters a normal mode in which a node for each unit participates in a network to request the network. Subsequently, each unit enters a sleep indication (SleepInd) mode where other nodes are not requested even though the network has already been requested by the other nodes. A communication mode is then terminated at each unit and each unit enters a wait bus sleep (WaitBusSleep) mode in which all nodes connected to the network are no longer in communication and are waiting to switch to sleep mode. Finally, each unit is powered off to prevent communication between units in the network.

9 Claims, 4 Drawing Sheets

(51) Int. Cl.
*H04L 12/24* (2006.01)
*H04L 12/40* (2006.01)
*H04L 29/06* (2006.01)

(56) References Cited

U.S. PATENT DOCUMENTS

| | | | |
|---|---|---|---|
| 2005/0151624 A1* | 7/2005 | Qualich | G05B 19/0428 340/5.72 |
| 2006/0212194 A1* | 9/2006 | Breed | G07C 5/008 701/1 |
| 2007/0038346 A1* | 2/2007 | Ehrlich | G07C 5/008 701/31.4 |
| 2010/0234071 A1* | 9/2010 | Shabtay | H04B 7/0408 455/562.1 |
| 2010/0269478 A1 | 10/2010 | Krins et al. | |
| 2010/0296478 A1* | 11/2010 | Hogenmueller et al. | 370/330 |
| 2011/0013510 A1 | 1/2011 | All et al. | |
| 2012/0105637 A1* | 5/2012 | Yousefi et al. | 348/148 |
| 2012/0106446 A1* | 5/2012 | Yousefi | H04N 7/183 370/328 |

OTHER PUBLICATIONS

Herpel, Thomas, "Performance Evaluation of Time-Critical Data Transmission in Automotive Communication Systems", (2009).

French Preliminary Search Report for French Application No. 1257888, issued May 10, 2016, 8 pages.

* cited by examiner

SYSTEM AND METHOD FOR MANAGING ETHERNET COMMUNICATION NETWORK FOR USE IN VEHICLE

CROSS-REFERENCE TO RELATED APPLICATION

The priority of Korean patent application No. 10-2011-0135799 filed on Dec. 15, 2011, the disclosure of which is hereby incorporated in its entirety by reference, is claimed.

FIELD OF THE INVENTION

Embodiments of the present invention relate to an internal communication network technology for a vehicle, and more particularly to a method for managing a vehicle Ethernet communication network so as to overcome the limitation of IP setup duration time contained in a dynamic host configuration protocol (DHCP) when constructing an internal communication network of the vehicle using Ethernet communication.

BACKGROUND

With the development of electronic technology, vehicles and associated technology are rapidly changing as an aggregate of the most advanced scientific technology. As various additional functions based on electronic control and video information beginning to be installed within vehicles, the amount of data transmitted over an internal communication network is also rapidly changing.

As a result, in the case of using the conventional control area network (CAN) communication network having a transfer rate of about 500 kbps, internal units of each vehicle may have difficulty in properly handling the amount of transmission/reception data in the long run. Accordingly, Ethernet communication is being intensively discussed and developed as a stable communication scheme for next-generation vehicle networks.

In the meantime, in the case of applying the Ethernet communication to a vehicle internal network (hereinafter referred to as a vehicle-embedded network), since the Ethernet communication has a data transfer rate of about 100 M~1 G bps, the network can be stably and reliably implemented without any problems, but it is necessary to consider Internet Protocol (IP) setting between communication units. A user must start and stop the engine of a vehicle whenever the IP is established between the communication units. As a result, the user may have difficulty allocating/managing IP in the vehicle. That is, if a dynamic address is used, the degree of freedom of the network is increased, however, the start up time is increased. In contrast, if a static address, network flexibility is decreased but the start-up time is also decreased.

All constituent components installed in the vehicle start normal operation as soon as a start-up key operates. In case of using the dynamic address, an excessively-long network start up time (for example, about 10 seconds) is required for initial startup. Some conventional enterprises have also considered static address allocation despite the static address allocation problems in which flexibility is deteriorated and an address must be independently managed for each constituent component of the vehicle.

However, assuming that four cameras mounted to front, rear, right and left sides of the vehicle are coupled to the Ethernet communication network, in case of the static address allocation, an IP must be allocated to each of the four cameras. If any one of the four cameras is out of order, a user must search for constituent components, addresses of which are allocated to the corresponding camera, and replace it with another, resulting in low compatibility and increased user inconvenience.

In addition, a network server must "pre-recognize" all information related to a node to be connected to the network. Thus, there are still many problems and restrictions associated with actual network management in CAN networks.

SUMMARY OF THE INVENTION

Various embodiments of the present invention are directed to providing a system and method for managing Ethernet communication network for a vehicle that substantially obviates one or more problems due to limitations and disadvantages of the related art.

An embodiment of the present invention relates to a vehicle-embedded communication network using Ethernet communication, and more specifically to a method for managing an Ethernet communication network of a vehicle that decreases an IP setting time based on a dynamic host configuration protocol (DHCP).

In accordance with one embodiment of the present invention, a method for managing a vehicle Ethernet communication network in which a node for each internal unit of the vehicle that performs Ethernet communication includes: performing a power-on (PowerOn) mode by applying power, e.g., from the vehicle's battery to each internal unit of the vehicle to initial each operation; performing a normal mode in which a node for each unit participates in a network and the network is then requested; performing a sleep indication (SleepInd) mode in which other nodes are not requested even when the network is requested by the other nodes; terminating a communication mode; performing a wait bus sleep (WaitBusSleep) mode in which all nodes connected to the network do not stay in the communication mode any longer and then wait for switching to the sleep mode; and performing a power-off mode by powering off so each unit so that it cannot communicate with another node.

Basic operations of the sleep indication (SleepInd) mode may be identical to those of the normal mode, but the sleep indication (SleepInd) mode does not awaken the network any longer differently from the normal mode. The method may further include entering the sleep indication (SleepInd) mode when a communication message occurs in the wait bus sleep (WaitBusSleep) mode, and entering the sleep mode once the wait bus sleep (WaitBusSleep) is maintained for a predetermined time.

The method may further include, in the sleep mode or the sleep indication (SleepInd) mode, when the corresponding node receives a predetermined wakeup signal, entering the normal mode. The predetermined wakeup signal may be implemented as a local wakeup signal caused by self-operations of each unit and a remote wakeup signal caused by Ethernet communication.

The method may further include, in the power-on (PowerOn) mode or the normal mode, performing address allocation for Ethernet communication of each node constructing the network. When the address allocation is completed, the normal mode is performed.

The power-off (PowerOff) mode may be activated when a battery is detached from the vehicle or when all units or CPU/MCU are powered off. When the battery is attached to the vehicle, the power-on (PowerOn) mode, the normal mode, the sleep indication (SleepInd) mode, and the sleep mode are sequentially performed, thereby completing network initial setup.

When all units contained in the network enter the sleep indication (SleepInd) mode, the wait bus sleep (WaitBusSleep) mode may be performed.

In accordance with another embodiment of the present invention, a system for managing a vehicle network in which a node for each unit contained in the vehicle performs Ethernet communication wherein at least one unit includes a dynamic host configuration protocol (DHCP) server. More specifically each unit of the network includes a first operation program storage unit configured to store an operation program including an Ethernet communication protocol, a first controller configured to provide overall control of a device based on a program stored in the first operation program storage unit, a first Ethernet communication unit communicating with another unit or the DHCP server, and a first self-address information storage unit configured to store self-address information allocated through communication with the DHCP server. The unit that includes the DHCP server includes more specifically includes a second operation program storage unit configured to store an operation program including an Ethernet communication protocol, a second controller configured to provide overall control of a device based on a program stored in the second operation program storage unit, a second Ethernet communication unit communicating with another unit, a second self-address information storage unit configured to store self-address information, at least one unit configured to store the address information of each unit so as to store address information of each unit constructing the network, and a mode storage unit configured to store an operation mode indicating an operation state of the network as data.

DESCRIPTION OF EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
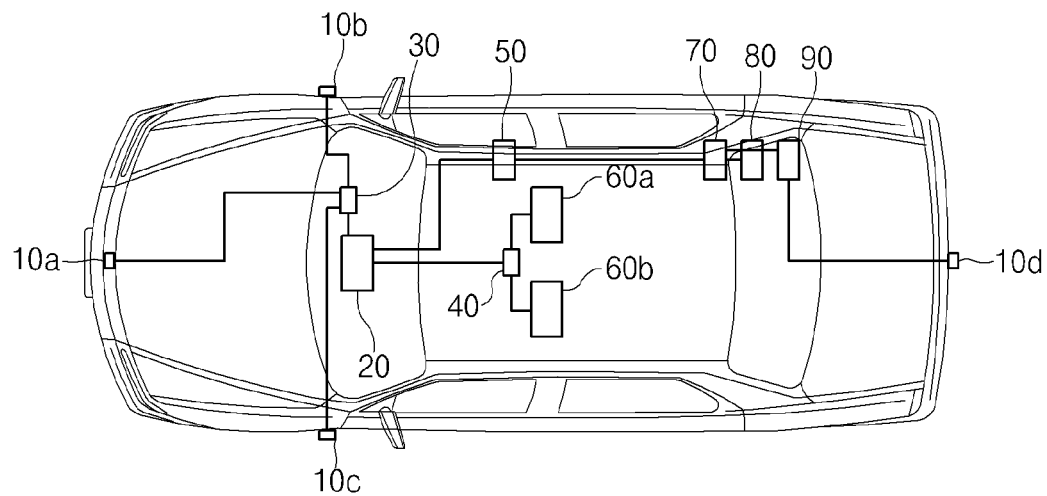
FIG. 1 is a diagram illustrating vehicle's internal components connected to a vehicle Ethernet communication network according to a first exemplary embodiment of the present invention.

FIG. 1 is a diagram illustrating a vehicle's internal components connected to a vehicle Ethernet communication network according to a first embodiment of the present invention. It should be noted that the first embodiment shown in FIG. 1 is disclosed only for illustrative purposes and the scope or spirit of the present invention is not limited thereto. That is, for convenience of description and better understanding of the present invention, only some units contained in the network system are disclosed in FIG. 1, but other examples may also be applied to the first embodiment of the present invention as necessary. Referring to FIG. 1, an electronic control unit (ECU) is embedded in individual electronic components (for example, cameras 1-14, a head unit 20, etc.) The electronic components comprise cameras 10a-10d, a head unit 20, a driver assist unit 30, a DVD player 40, an amplifier 50, rear seat display units 60a, 60b, a satellite radio 70, a Bluetooth 80, GPS 90.

Each ECU is mounted/installed within a vehicle, and an Ethernet communication program according to the present invention is embedded in each ECU.

The DHCP server according to the present invention can be implemented within any of the electronic constituent elements of the vehicular network that include or are operated by an ECU. Thus, the manufacturing company may discern the best location to install the DHCP server according to the strategic necessity or utility investigation result during the vehicle design and fabrication process. For convenience of description and better understanding of the present invention, it is assumed that the DHCP server is implemented in a driver assist unit (DAU) 30 according to the first embodiment of the present invention.

Figure 2:
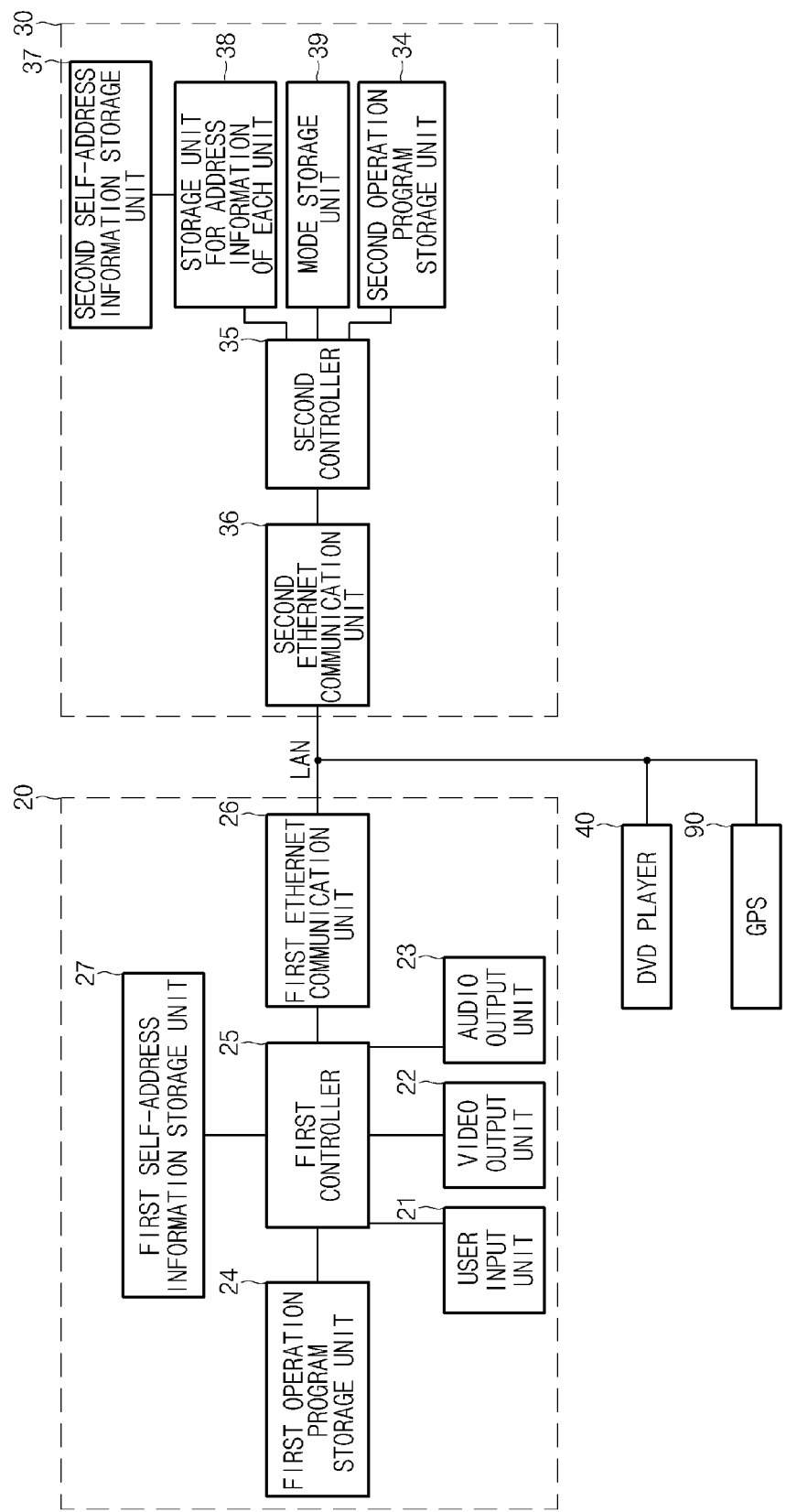
FIG. 2 is a block diagram illustrating the principal components of a vehicle Ethernet communication network system shown in FIG. 1.

FIG. 2 is a block diagram illustrating the principal components of a vehicle Ethernet communication network system shown in FIG. 1. Referring to FIG. 2, a reference number 20 is a head unit embedded in the vehicle. The head unit 20 includes a user input unit 21, a video output unit 22, an audio output unit 23, a first operation program storage unit 24 for storing an operation program, a first controller 25 for providing overall control of a device based on a program stored in the first operation program storage unit 24, a first Ethernet communication unit 26 communicating with another unit or a DHCP server; and a first self-address information storage unit 27 for storing self-address information allocated through communication with the DHCP server.

A driver assist unit (DAU) 30 includes a DHCP server. The DHCP server 30 includes a second operation program storage unit 34 storing an operation program including a vehicle Ethernet communication protocol, a second providing overall control of the device on the basis of a program stored in the second operation program storage unit 34, a second Ethernet communication unit 36 communicating with other units in the network, a second self-address information storage unit 37 storing self-address information, a unit 38 storing address information of each unit, and a mode storage unit 39 storing a network operation state (i.e., a network operation mode) as data.

Figure 3:
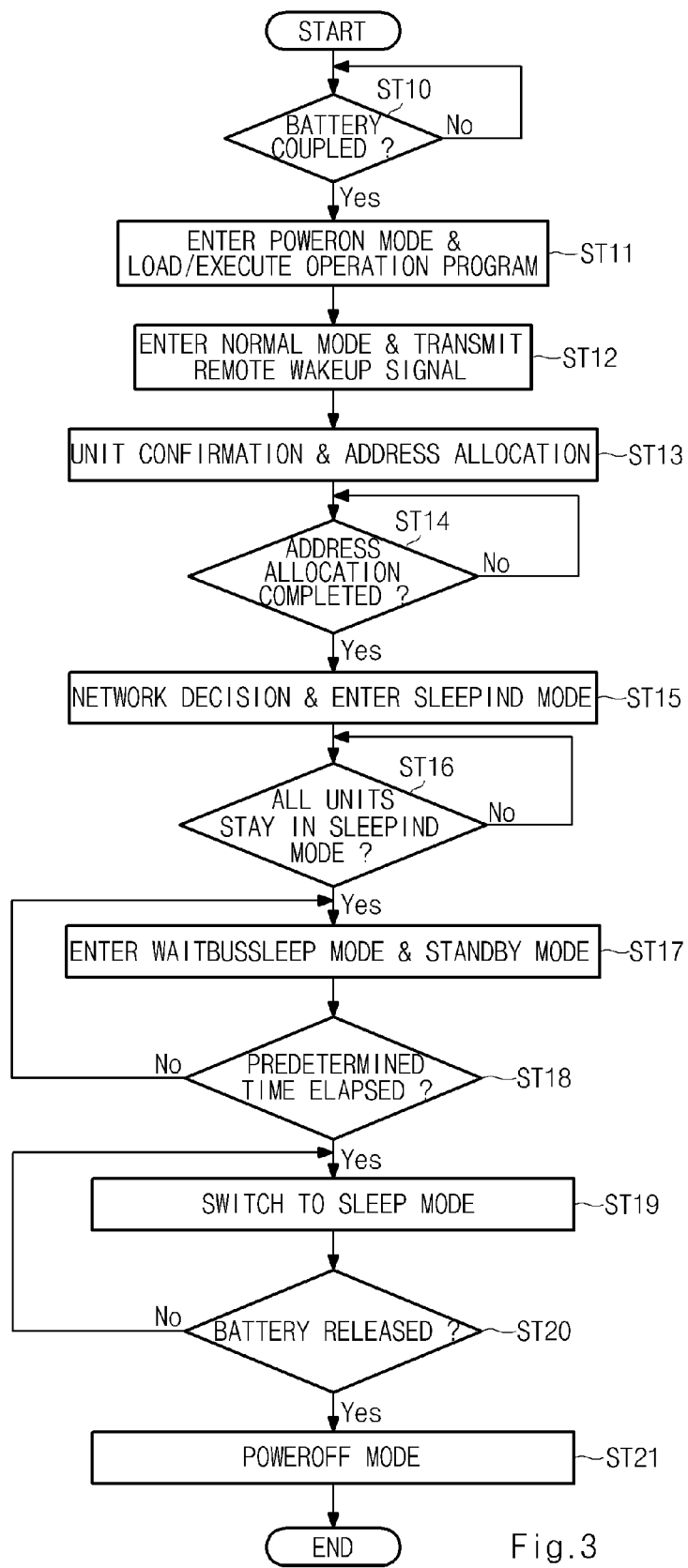
FIG. 3 is a flowchart illustrating operations of the vehicle Ethernet communication network system shown in FIG. 2.

FIG. 3 is a flowchart illustrating operations of the vehicle Ethernet communication network system shown in FIG. 2. A method for managing a vehicle Ethernet communication network according to the present invention will hereinafter be described with reference to FIG. 3. Referring to FIG. 3, a method for operating/managing the vehicle Ethernet communication network includes 6 operation modes, i.e., a PowerOn mode, a normal mode, a sleep indication (SleepInd) mode, a WaitBusSleep Mode, a sleep mode, and a PowerOFF mode.

Figure 4:
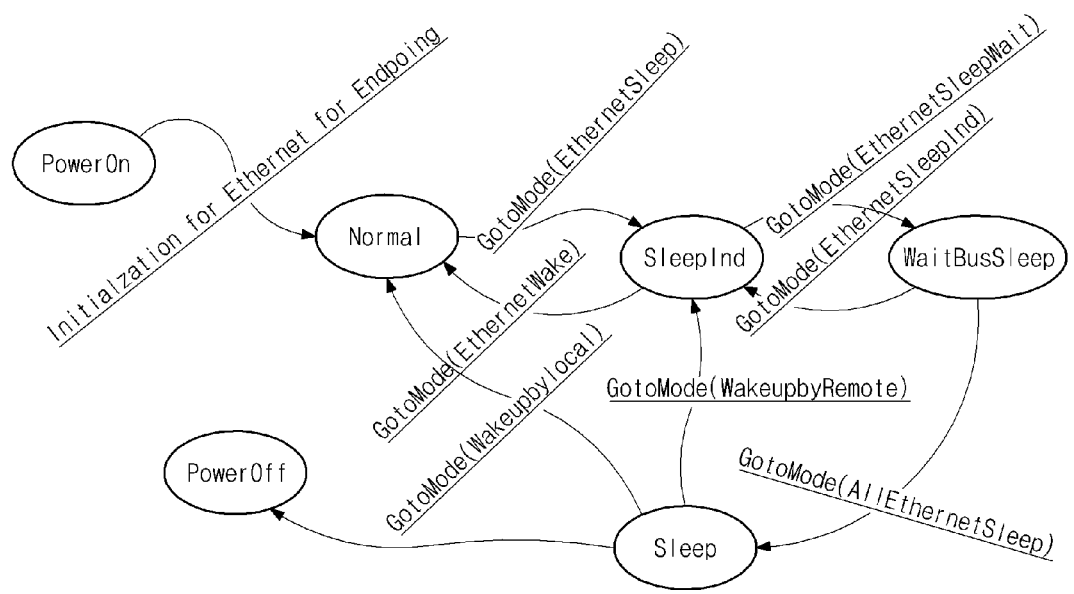
FIG. 4 is a status diagram of the vehicle Ethernet communication network according to a first exemplary embodiment of the present invention.

FIG. 4 is a status diagram of the vehicle Ethernet communication network according to a first embodiment of the present invention. In more detail, FIG. 4 is a status diagram illustrating mutual operational relationships of the above-mentioned six operation modes. Referring to FIG. 4, the PowerOn mode is used, e.g., for battery attachment in a vehicle fabrication process. That is, during the PowerOn mode, battery power is applied to each unit of the vehicle, so that operational initialization is performed by each operation program. During the normal mode, an ECU of each unit participates in a network, and requests a network connection.

During the sleep indication (SleepInd) mode, the network has been requested by another unit and other nodes are not requested during this mode. In more detail, although the basic operations of the SleepInd mode are basically identical to those of the normal mode, the network is not awakened in the SleepInd mode which is different from the normal mode. However, the SleepInd mode can be switched to the normal mode once a signal has been received by the ECU. The sleep mode stops communication with other parties. In case of the WaitBusSleep mode, all nodes (or units) connected to the network do not communicate with others but are ready to enter the sleep mode. If a communication message occurs in the WaitBusSleep mode, the sleepInd mode starts operation.

During the PowerOff mode, the vehicle battery is detached or all units or CPU/MCU are powered off so that it is impossible for the corresponding unit contained in the vehicle Ethernet communication network system to communicate with each other.

Referring to FIG. 3, after various electronic components of a vehicle have been completely assembled in a vehicle fabrication process, once battery power is applied to each unit of the vehicle in step ST10, the controller 25 or 35 of each unit enters the PowerOn mode, loads a program stored in the operation program storage unit 24 or 34, and perform initialization based on the loaded program in step ST11.

After the above-mentioned initialization, the controller 25 or 35 enters the normal mode, and broadcasts a remote wakeup (RemoteWakeup) signal to awaken the entire network in step ST12. Subsequently, the second controller 35 of the driver assist unit (DAU) 30 including the DHCP server confirms the presence of each unit in the network architecture, and allocates an Ethernet address for each unit in step ST13. Once address allocation is completed through the above-mentioned process in step ST14, the DAU determines the network and enters a sleep indication (SleepInd) mode in step ST15.

If all the units are switched into the SleepInd mode by the above-mentioned process in step ST16, the operation mode of the network enters a WaitBusSleep mode and switches to a standby mode in step ST17. If the WaitBusSleep mode is maintained for a predetermined time (for example, about 500 ms) in step ST18, the network operation mode switches to the sleep mode in step ST19.

The sleep mode indicates a communication termination state in which the system stops communication after being powered on. During the sleep mode, if the vehicle is shut off, for example, the network enters the sleep mode. That is, during the sleep mode, rather than switching the network to a PowerOff mode, the network is instead kept in sleep mode (in steps ST20-ST21).

When address allocation is completed by the above-mentioned procedures, the vehicle is delivered to a purchaser (driver). Accordingly, a local wakeup signal occurs by activation of a series of sensors to be operated when the vehicle driver opens any one of the vehicle doors or operates a vehicle-embedded audio system, such that the network operation mode is immediately switched from the sleep mode to the SleepInd mode and a remote wakeup function is activated by the wakeup signal based on the Ethernet communication. As a result, the sleep mode is switched to the SleepInd mode, such that respective electronic components mounted to the vehicle can be normally operated. That is, the vehicle Ethernet communication network management system and method according to the above-mentioned embodiment, when constructing the vehicle-embedded communication network using the Ethernet communication, can solve excessive IP allocation caused by a DHCP and the limitation of the IP setup time.

As is apparent from the above description, the vehicle-embedded communication network using the Ethernet communication according to embodiments of the present invention can overcome excessive IP allocation and the limitation of IP setting time caused by a DHCP. In particular, it can guarantee the same network flexibility as dynamic address allocation, and can quickly establish network registration in the same manner as in the static address allocation. As a result, electronic constituent components of the vehicle are quickly booted up and the vehicle begins normal operation more rapidly, such that a vehicle-embedded network can be stably operated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing a vehicle communication network in which a node of a plurality of nodes for each internal unit of a plurality of internal units of the vehicle communication network establishes a communication mode, the method comprising:

entering, by each internal unit of the plurality of internal units in the vehicle communication network, a first operation mode of a power-on (PowerOn) mode wherein power is provided to each internal unit of the plurality of internal units in the vehicle communication network to initialize each operation mode in each internal unit of the plurality of internal units;

entering, by each internal unit of the plurality of internal units in the vehicle communication network, a second operation mode of a normal mode wherein the node of the plurality of nodes in each internal unit of the plurality of internal units participates in the vehicle communication network and the vehicle communication network will request to establish the communication mode;

entering, by each internal unit of the plurality of internal units in the vehicle communication network, a third operation mode of a sleep indication (SleepInd) mode wherein other nodes of the plurality of nodes are not requested even when the vehicle communication network is requested by the other nodes of the plurality of nodes;

terminating, by each internal unit of the plurality of internal units in the vehicle communication network, the communication mode;

entering, by each internal unit of the plurality of internal units in the vehicle communication network, a fourth operation mode of a wait bus sleep (WaitBusSleep) mode wherein all nodes of the plurality of nodes that are connected to the vehicle communication network are not in communication and are awaiting to enter a sleep mode;

entering, by each internal unit of the plurality of internal units in the vehicle communication network, the third operation mode of the sleep indication (SleepInd) mode when a communication message occurs in the wait bus sleep (WaitBusSleep) mode;

entering, by each internal unit of the plurality of internal units in the vehicle communication network, a fifth operation mode of the sleep mode when the wait bus sleep (WaitBusSleep) is maintained for a predetermined time; and entering, by each internal unit of the plurality of internal units in the vehicle communication network, a sixth operation mode of a power-off mode in which each internal unit of the plurality of internal units is powered off thereby preventing each internal unit of the plurality of internal units from communicating with another internal unit of the plurality of internal units in the vehicle communication network, wherein the sleep indication (SleepInd) mode is between the normal mode and the wait bus sleep (WaitBusSleep) mode, and wherein basic operations of the sleep indication (SleepInd) mode are identical to those of the normal mode, but the sleep indication (SleepInd) mode will no longer be connected and will not awake the vehicle communication network.

2. The method according to claim 1, further comprising:
in the sleep mode or the sleep indication (SleepInd) mode, once a corresponding node of the plurality of nodes receives a predetermined wakeup signal, entering the second operation mode of the normal mode.

3. The method according to claim 2, wherein the predetermined wakeup signal is implemented as a local wakeup signal caused by self-operations of each internal unit of the plurality of internal units and a remote wakeup signal caused by communication in the vehicle communication network.

4. The method according to claim 1, further comprising:
in the power-on (PowerOn) mode or the normal mode, performing address allocation for communication of each node of the plurality of nodes constructing the vehicle communication network.

5. The method according to claim 4, further comprising:
when the address allocation is completed, entering the second operation mode of the normal mode.

6. The method according to claim 1, wherein the power-off (PowerOff) mode is activated when a battery is detached from a vehicle or when all internal units of the plurality of internal units are powered off.

7. The method according to claim 6, further comprising:
when the battery is attached to the vehicle, sequentially entering the first operation mode of the power-on (PowerOn) mode, the second operation mode of the normal mode, the third operation mode of the sleep indication (SleepInd) mode, and the fifth operation mode of the sleep mode, thereby completing initial setup of the vehicle communication network.

8. The method according to claim 1, further comprising:
when all internal units of the plurality of internal units in the vehicle communication network enter the sleep indication (SleepInd) mode, performing the fourth operation mode of the wait bus sleep (WaitBusSleep) mode.

9. A system for managing a vehicle communication network wherein a node of a plurality of nodes for each unit of a plurality of units in the vehicle communication network establishes a communication mode based on at least one unit of the plurality of units which includes a dynamic host configuration protocol (DHCP) server, the system comprising:

each unit of the plurality of units of the vehicle communication network including:
a first operation program storage configured to store an operation program including a communication protocol,
a first controller configured to provide overall control of a device based on a program stored in the first operation program storage,
a first communication unit configured to communicate with at least one other unit of the plurality of units or the DHCP server, and
a first self-address information storage configured to store self-address information allocated through communication with the DHCP server, wherein the at least one unit of the plurality of units which includes the DHCP server includes:
a second operation program storage configured to store an operation program including the communication protocol,
a second controller configured to provide overall control of a device based on a program stored in the second operation program storage,
a second communication unit configured to communicate with at least one other unit of the plurality of units in the vehicle communication network,
a second self-address information storage configured to store self-address information,
a third storage configured to store address information of each unit of the plurality of units so as to store address information of each unit of the plurality of units constructing the vehicle communication network, and
a mode storage configured to store an operation mode indicating an operation state of the vehicle communication network as data, wherein the operation program includes at least: entering, by each unit of the plurality of units in the vehicle communication network, a first operation mode of a sleep indication (SleepInd) mode wherein other nodes of the plurality of nodes are not requested even when the vehicle communication network is requested by the other nodes of the plurality of nodes, entering, by each unit of the plurality of units in the vehicle communication network, the first operation mode of the sleep indication (SleepInd) mode when a communication message occurs in a second operation mode of a wait bus sleep (WaitBusSleep) mode, and entering, by each unit of the plurality of units in the vehicle communication network, a third operation mode of a sleep mode when the wait bus sleep (WaitBusSleep) mode is maintained for a predetermined time, the sleep indication (SleepInd) mode is between a fourth operation mode of a normal mode and the wait bus sleep (WaitBusSleep) mode, and basic operations of the sleep indication (SleepInd) mode are identical to those of the normal mode, but the sleep indication (SleepInd) mode will no longer be connected and will not awake the vehicle communication network.

* * * * *